(12) United States Patent
Socha et al.

(10) Patent No.: US 12,042,864 B2
(45) Date of Patent: Jul. 23, 2024

(54) THERMALLY DECOMPOSING BUILD PLATE WITH CASTING MOLD FOR FACILE RELEASE OF 3D PRINTED OBJECTS

(71) Applicant: INDIUM CORPORATION, Utica, NY (US)

(72) Inventors: David P. Socha, Whitesboro, NY (US); Geoff Beckwith, Norway, NY (US); Robert Ploessl, Ithaca, NY (US)

(73) Assignee: INDIUM CORPORATION, Utica, NY (US)

( * ) Notice: Subject to any disclaimer, the term of this patent is extended or adjusted under 35 U.S.C. 154(b) by 0 days.

(21) Appl. No.: 17/678,752

(22) Filed: Feb. 23, 2022

(65) Prior Publication Data

US 2022/0266343 A1 Aug. 25, 2022

Related U.S. Application Data

(60) Provisional application No. 63/152,788, filed on Feb. 23, 2021.

(51) Int. Cl.
*B22F 12/30* (2021.01)
*B22C 9/08* (2006.01)
(Continued)

(52) U.S. Cl.
CPC ............... *B22F 12/30* (2021.01); *B22C 9/08* (2013.01); *B22F 5/006* (2013.01); *B22F 5/007* (2013.01);
(Continued)

(58) Field of Classification Search
CPC .......... B22F 12/30; B22F 12/82; B22F 5/006; B22F 5/007; B22F 10/70; B22F 3/24;
(Continued)

(56) References Cited

U.S. PATENT DOCUMENTS 3,614,980 A * 10/1971 Lander .................... B22C 21/14
164/358
5,980,812 A 11/1999 Lawton
(Continued)

FOREIGN PATENT DOCUMENTS

CN 102921927 B 6/2014
CN 108247066 A * 7/2018 ............ B22F 3/1055
(Continued)

OTHER PUBLICATIONS

CN-108247066-A: Espacenet English machine translation (Year: 2018).*
(Continued)

*Primary Examiner* — Adil A. Siddiqui
(74) *Attorney, Agent, or Firm* — Sheppard, Mullin, Richter & Hampton LLP

(57) ABSTRACT

Additive manufacturing structures and methods that enable the facile release of 3D printed parts are described. In one implementation, an additive manufacturing structure includes: a body; and a recessed section formed through a surface of the body, the recessed section comprising: a pour hole for filling the recessed section with a liquid metal or metal alloy that solidifies into an insert having a surface for forming a 3D object in a 3D printing device; and one or more air holes configured to release air displaced by the liquid metal or metal alloy.

20 Claims, 11 Drawing Sheets

(51) Int. Cl.
  *B22F 3/24* (2006.01)
  *B22F 5/00* (2006.01)
  *B22F 10/28* (2021.01)
  *B22F 10/40* (2021.01)
  *B22F 10/70* (2021.01)
  *B22F 12/82* (2021.01)
  *B33Y 10/00* (2015.01)
  *B33Y 30/00* (2015.01)
  *B33Y 40/10* (2020.01)
  *B33Y 80/00* (2015.01)
  *B33Y 99/00* (2015.01)

(52) U.S. Cl.
  CPC .............. *B22F 10/28* (2021.01); *B22F 10/70* (2021.01); *B22F 12/82* (2021.01); *B33Y 30/00* (2014.12); *B33Y 40/10* (2020.01); *B33Y 80/00* (2014.12); *B33Y 99/00* (2014.12); *B22F 3/24* (2013.01); *B22F 10/40* (2021.01); *B22F 2999/00* (2013.01); *B33Y 10/00* (2014.12)

(58) Field of Classification Search
  CPC ...... B22F 10/40; B22F 2999/00; B22F 10/28; B22C 9/08; B22C 9/00; B22C 9/02; B22C 9/06; B22C 9/067; B33Y 30/00; B33Y 99/00; B33Y 10/00; B33Y 40/10
  See application file for complete search history.

(56) References Cited

U.S. PATENT DOCUMENTS

| | | | |
|---|---|---|---|
| 6,298,904 B2* | 10/2001 | Polich | B22C 9/04 164/35 |
| 6,375,880 B1 | 4/2002 | Cooper et al. | |
| 6,446,698 B1* | 9/2002 | Soderstrom | B22C 9/02 164/57.1 |
| 6,547,552 B1 | 4/2003 | Fudim | |
| 6,830,643 B1 | 12/2004 | Hayes | |
| 7,140,415 B1* | 11/2006 | Wilson | B22D 35/04 164/359 |
| 8,627,875 B1* | 1/2014 | Pinkstock | B22C 9/10 164/369 |
| 9,321,215 B2 | 4/2016 | Dudley | |
| 2003/0065400 A1 | 4/2003 | Beam et al. | |
| 2004/0242728 A1 | 12/2004 | Xu et al. | |
| 2005/0016707 A1* | 1/2005 | Osanai | B22D 19/00 164/98 |
| 2005/0156361 A1 | 7/2005 | Holowczak et al. | |
| 2007/0126157 A1 | 6/2007 | Bredt | |
| 2008/0042321 A1 | 2/2008 | Russell et al. | |
| 2010/0252713 A1* | 10/2010 | Saito | B22C 9/067 249/141 |
| 2011/0097498 A1 | 4/2011 | Yen et al. | |
| 2012/0018115 A1 | 1/2012 | Hovel et al. | |
| 2012/0146261 A1* | 6/2012 | Beuerlein | B22D 17/145 249/141 |
| 2012/0156466 A1 | 6/2012 | Bell et al. | |
| 2015/0145174 A1 | 5/2015 | Comb | |
| 2015/0258744 A1 | 9/2015 | Muller et al. | |
| 2015/0360287 A1 | 12/2015 | Zink et al. | |
| 2015/0367411 A1* | 12/2015 | Witmyer | B22D 29/001 164/349 |
| 2016/0031010 A1 | 2/2016 | O'Neill et al. | |
| 2016/0082656 A1 | 3/2016 | Yu et al. | |
| 2016/0175923 A1* | 6/2016 | Liu | B22C 9/10 164/271 |
| 2016/0176118 A1 | 6/2016 | Reese et al. | |
| 2016/0332387 A1 | 11/2016 | Jondal et al. | |
| 2017/0252819 A1 | 9/2017 | Gibson et al. | |
| 2018/0043612 A1 | 2/2018 | Gray et al. | |
| 2018/0117854 A1 | 5/2018 | Hart et al. | |
| 2018/0200800 A1 | 7/2018 | Hart et al. | |
| 2018/0236557 A1 | 8/2018 | Garay et al. | |
| 2019/0009332 A1 | 1/2019 | Rockstroh | |
| 2019/0160734 A1 | 5/2019 | Biesboer et al. | |
| 2019/0177473 A1 | 6/2019 | Bashir et al. | |
| 2019/0375014 A1 | 12/2019 | Kernan et al. | |
| 2020/0001351 A1* | 1/2020 | Lin | B22C 9/02 |
| 2020/0101534 A1 | 4/2020 | Gibson | |
| 2021/0053122 A1 | 2/2021 | Socha et al. | |

FOREIGN PATENT DOCUMENTS

| | | |
|---|---|---|
| CN | 108748993 A | 11/2018 |
| EP | 2986406 | 2/2016 |
| EP | 3424620 A1 | 1/2019 |
| EP | 3461572 A1 | 4/2019 |
| EP | 3084129 B1 | 5/2019 |
| EP | 3486008 | 5/2019 |
| JP | H09-216047 A | 8/1997 |
| JP | 2010100883 A | 5/2010 |
| JP | 5189953 B2 | 4/2013 |
| KR | 2010-0064195 A | 6/2010 |
| WO | WO 2017/152142 | 9/2017 |
| WO | WO 2021/262679 | 12/2021 |

OTHER PUBLICATIONS

Non-final Office Action dated Jan. 17, 2023 for U.S. Appl. No. 16/998,650, filed Aug. 20, 2020.

International Search Report and Written Opinion mailed May 27, 2022 for International Application No. PCT/US2022/017546, filed Feb. 23, 2022.

International Search Report and Written Opinion mailed Jun. 8, 2022 for International Application No. PCT/US2022/017529, filed Feb. 23, 2022.

International Search Report and Written Opinion mailed Nov. 3, 2020 for International Application No. PCT/US2020/047213, filed Aug. 20, 2020.

Hendrixson, Stephanie, "Machining Module Automates 3D-Printed Part Removal," Modern Machine Shop, Additive Manufacturing, Dec. 6, 2017, 1 page, https://www.mmsonline.com/blog/post/machining-module-automates-3d-printed-part-removal.

Lefky et al., "Dissolvable Supports in Powder Bed Fusion-Printed Stainless Steel," 3D Printing and Additive Manufacturing, vol. 4, No. 1 (2017), 11 pages, https://www.liebertpub.com/doi/pdfplus/10.1089/3dp.2016.0043.

Stratasys Press Release, "Pioneering a New Era in 3D Printed Production Metal Parts," Nov. 13, 2018, 4 pages, http://investors.stratasys.com/news-releases/news-release-details/pioneering-new-era-3d printed-production-metal-parts.

International Search Report and Written Opinion mailed May 26, 2023 for International Application No. PCT/US2023/016220, filed Mar. 24, 2023.

European Examination Report—Communication pursuant to Article 94(3) EPC dated Jan. 10, 2023 for European Application No. 20767660.2.

Non-final Office Action dated May 3, 2023 for U.S. Appl. No. 17/678,820, filed Feb. 23, 2022.

Final Office Action mailed Nov. 2, 2023 for U.S. Appl. No. 17/678,820.

Non-final Office Action mailed Nov. 16, 2023 for U.S. Appl. No. 18/125,965.

* cited by examiner

THERMALLY DECOMPOSING BUILD PLATE WITH CASTING MOLD FOR FACILE RELEASE OF 3D PRINTED OBJECTS

CROSS-REFERENCE TO RELATED APPLICATIONS

The present application claims the benefit of U.S. Provisional Patent Application No. 63/152,788 filed on Feb. 23, 2021 and titled "THERMALLY DECOMPOSING BUILD PLATE WITH CASTING MOLD FOR FACILE RELEASE OF 3D PRINTED OBJECTS," which is incorporated herein by reference in its entirety.

DESCRIPTION OF THE RELATED ART 3D printing, also known as additive manufacturing, involves depositing print material into sequential layers onto a build plate until the desired 3D print is formed. 3D printing methods build parts layer by layer, but most require a platform or build plate to serve as the starting point. The first few layers of print material will bond onto the surface of the build plate, and the following layers build on this surface.

3D plastic printed parts may use plastic powder or plastic cord as feedstock, combined with a binder. A UV source or thermal treatment solidifies and shapes the object layer by layer. The final step is to remove the plastic 3D printed object from the build plate with a light force and/or some mild scraping.

3D metal printed parts are printed on a build plate. The feedstock is made of metal powders or combination of powders. The build plate is placed into the 3D printing machine. Once the machine is activated, a blade deposits a layer of metal powder over the build plate. A laser or series of lasers selectively sinters the metal that will become part of the 3D printed object. The first few passes of the laser essentially weld what will become the 3D printing object to the build plate. The blade then deposits new powdered metal across the surface of the build plate. Selective sintering is repeated and the object is created layer by layer.

Once the printing process is complete, the bond between the print material and the build plate will need to be broken for the printed object to be removed from the build plate. The bond between the print material and the surface of the build plate may make it difficult to separate the 3D printed object from the build plate following completion of the print process. To remove print material from the build plate, a user may be required to employ tools such as a band saw or wire electrical discharge machining (EDM) machine, or other means, to mechanically separate the print material from the build plate.

SUMMARY

Some implementations of the disclosure are directed to additive manufacturing structures and methods that enable the facile release of 3D printed parts.

In one embodiment, an additive manufacturing structure, comprises: a body; and a recessed section formed through a surface of the body, the recessed section comprising: a pour hole for filling the recessed section with a liquid metal or metal alloy that solidifies into an insert having a surface for forming a 3D object in a 3D printing device; and one or more air holes configured to release air displaced by the liquid metal or metal alloy.

In some implementations, the pour hole is tapered to facilitate release of the insert from the recessed section.

In some implementations, the one or more air holes are tapered.

In some implementations, the additive manufacturing structure further comprises the insert.

In some implementations, the insert, when secured in the recessed section, forms a flat surface flush at top edges of the recessed section.

In some implementations, the additive manufacturing structure further comprises the 3D object printed on the surface of the insert, wherein the solidus temperature of the insert is lower than a solidus temperature of the 3D object.

In some implementations, the additive manufacturing structure is configured as a casting mold for forming the insert that is not useable in the 3D printing device.

In some implementations, the body comprises a single part including a top surface, a bottom surface, and sidewalls; and the recessed section is formed through the top surface.

In some implementations, the additive manufacturing structure is configured as a casting mold and a build plate, wherein the body is dimensioned such that the additive manufacturing structure is useable in the 3D printing device.

In some implementations, the additive manufacturing structure further comprises one or more holes extending through the body, the one or more holes configured to receive one or more structural protrusions of the 3D printing device to hold the additive manufacturing structure in place during 3D printing.

In one embodiment, an additive manufacturing system comprises: a build plate useable within a 3D printing device, the build plate including a first body having a first recessed section formed through a surface of the first body, and the first recessed section including a first hole; and an insert of a solid metal or metal alloy that provides a surface for forming a 3D printed object in the 3D printing device, the insert dimensioned to be inserted into the first recessed section, and the insert comprising a first protruding nub configured to be received within the first hole of the first recessed section.

In some implementations, the additive manufacturing system further comprises: a casting mold configured to form the insert, the casting mold including a second body having a second recessed section formed through a surface of the second body, the second recessed section comprising a pour hole for filling the second recessed section with a liquid metal or metal alloy that solidifies into the insert.

In some implementations, dimensions of the first recessed section and the second recessed section are substantially the same; and the first hole of the first recessed section is larger than the pour hole.

In some implementations, the second recessed section further comprises: an air hole configured to release air displaced by the liquid metal or metal alloy; the first recessed section further comprises: a second hole larger than the air hole; and the insert further comprises a second protruding nub configured to be received within the second hole of the first recessed section.

In some implementations, the first hole, the second hole, the pour hole, the air hole, the first protruding nub, and the second protruding nub are tapered.

In one embodiment, an additive manufacturing system comprises: a build plate useable within a 3D printing device, the build plate including a first body having a first recessed section formed through a surface of the first body; an insert of a solid metal or metal alloy that provides a surface for forming a 3D printed object in the 3D printing device, the insert dimensioned to be inserted into the first recessed section, and the insert have a solidus temperature lower than a solidus temperature of the build plate; and a casting mold configured to form the insert from a liquid metal or metal alloy, the casting mold including a second body having a second recessed section formed through a surface of the second body.

In one embodiment, a method comprises: obtaining a casting mold, the casting mold including a first body having a first recessed section formed through a surface of the first body; forming, within the first recessed section of the casting mold, a solid metal insert having a surface for forming a 3D object in a 3D printing device; after forming the solid metal insert, removing the solid metal insert from the casting mold; and after removing the solid metal insert, securing the solid metal insert within a second recessed section of a build plate useable within the 3D printing device, the build plate including a second body having the second recessed section formed through a surface of the second body.

In some implementations, the method further comprises: after securing the solid metal insert within the second recessed section of the build plate, 3D printing the 3D object on the surface of the solid metal insert, wherein the solid metal insert has a solidus temperature lower than a solidus temperature of the build plate and the 3D object.

In some implementations, forming the solid metal insert within the first recessed section comprises pouring, into a pour hole of the first recessed section, a liquid metal or metal alloy that solidifies into the solid metal insert; and releasing, via one or more air holes of the first recessed section, air displaced by the liquid metal or metal alloy.

In one embodiment, a method comprises: securing a solid metal insert including a first protruding nub within a recessed section of a build plate, the build plate including a body having the recessed section formed through a surface of the body, and the recessed section comprising a first hole for receiving the first protruding nub; and after securing the solid metal insert within the recessed section of the build plate, 3D printing a 3D metal object on a surface of the solid metal insert, wherein the solid metal insert has a solidus temperature lower than a solidus temperature of the build plate and the 3D metal object.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more implementations, is described in detail with reference to the following figures. The figures are provided for purposes of illustration only and merely depict example implementations. Furthermore, it should be noted that for clarity and ease of illustration, the elements in the figures have not necessarily been drawn to scale.

Some of the figures included herein illustrate various implementations of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

Figure 1:
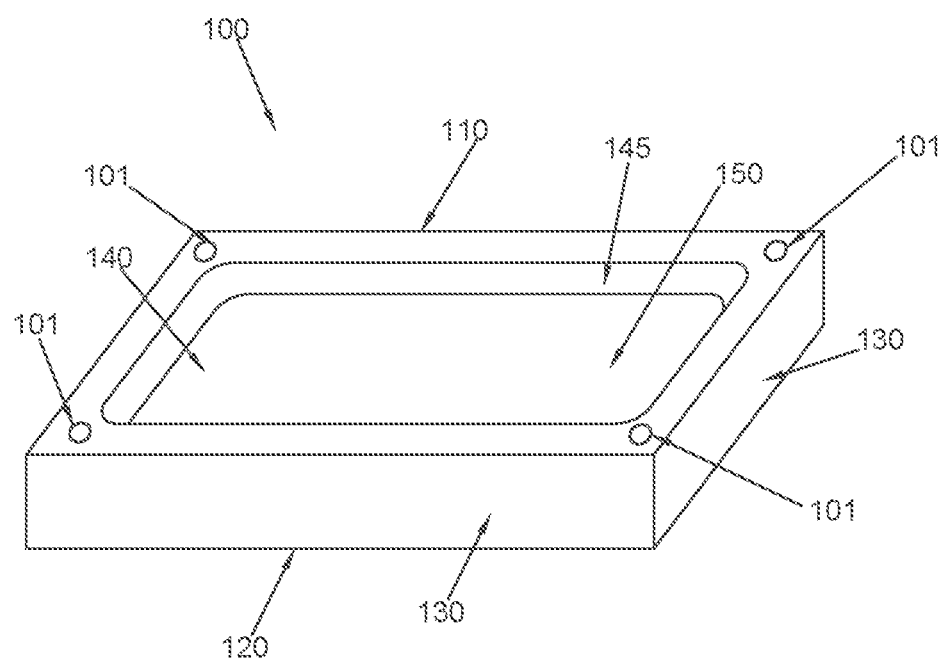
FIG. 1 shows a perspective view of a build plate that can be used for 3D printing in accordance with implementations of the disclosure.

The figures are not exhaustive and do not limit the present disclosure to the precise form disclosed.

DETAILED DESCRIPTION OF THE EMBODIMENTS

There is a need for improving techniques in additive manufacturing for removing workpieces that are essentially welded to a build plate. One challenge is to free the parts without damaging them, but also to protect the build plate so that it can be reused. As noted above, mechanical means, such as by use of a bandsaw or wire EDM, are typically employed to cut and remove a 3D printed from a build plate outside of the 3D printer. The build plate may then be machined separately to remove excess material and return them to a usable state. Such separation techniques, however, may be problematic.

Current mechanical removal approaches may lead to damage of the 3D printed part, damage to the surface of the build plate, and/or injury to the user. First, mechanical removal of the part by cutting may require hours of post processing to bring the 3D printed part back to its desired shape. Second, by cutting the 3D printed part away from the build plate, a portion of the welded part (post) requires grinding to remove that remaining piece from the build plate and to return the build plate to a smooth surface for reuse. This process of ensuring that all printed material is removed from a build plate before beginning a new printing process may be tedious and time consuming, as well as potentially harmful to the build plate. Moreover, mechanical removal techniques such as using a bandsaw or wire EDM require 3D printed parts to have a standoff between the part and the build plate to allow access for the band saw or wire EDM clearance, which requires additional, consumable metal powder.

Although not taught for removal of 3D metal printed/laser sintered parts from a build plate, a chemical removal method has been proposed for separating 3D printed support structures from a 3D printed object. By applying this method, certain areas of a metal additive manufacturing part react chemically when immersed in a corrosive solution. The technique involves a controlled degradation that eats away at the supports while leaving actual part virtually intact. This process may use sodium hexacyanoferrate as a sensitizing agent. Although this chemical etching process of support and part removal may reduce the removal and post processing time of traditional machining, it relies on the application of corrosive chemicals.

To address the aforementioned deficiencies of the art, the present systems and methods described in the disclosure are directed to simplifying 3D printed object removal from a build plate without the use of expensive saws, complex machines, or harsh chemicals. In accordance with implementations of the disclosure, a thermally decomposable build plate may enable the facile release of 3D metal printed parts created by additive manufacturing. During 3D metal printing or laser sintering, a print material may bond onto a surface of the build plate having a lower melting temperature than the print material and the rest of the build plate. Once the printing process is completed, the assembly may be treated with heat, thereby melting the bond surface between the 3D printed object and the build plate, and releasing the 3D printed object.

In contrast to mechanical removal of a 3D printed metal part that often necessitates hours of post processing to reshape and polish the bottom of the object and to resurface the build plate for reuse, by applying the systems and methods described herein, a facile removal of a 3D printed object from a build plate may be enabled without damage to the 3D printed part. Little or no post processing, finishing, reshaping, and/or polishing the 3D printed object may be needed by applying the 3D printed part removal systems and methods disclosed herein. Moreover, by virtue of applying the systems and methods described herein, object removal from a build plate may be accelerated without the use of corrosive chemicals, thereby offering a user additional time and cost-savings in additive manufacturing.

FIG. 1 shows a perspective view of a build plate 100 that can be used for additive manufacturing or 3D printing in accordance with implementations of the disclosure. As shown, build plate 100 includes a top surface 110, a bottom surface 120 and four sidewalls 130 that extend between the top and bottom surfaces. The build plate 100, including the top, bottom, and side surfaces, may be made of copper, stainless steel, tool steel, tin, aluminum, cemented carbide, ceramic, graphite, or some other suitable material. In particular, as further described below, the build plate 100 may be made of material (e.g., metal or metal alloy) having a solidus temperature that is substantially higher (e.g., at least 30° C.) than that of a thermally decomposable material that is placed or formed in its recessed section 140, and used to create a bond between build plate 100 and a 3D printed object during 3D printing. For example, the build plate 100 may have a melting temperature that is greater than 1000° C.

Although depicted in the shape of a rectangular prism or cuboid having sidewalls that extend perpendicularly between the top surface 110 and bottom surface 120, it should be noted that in other implementations build plate 100 may be some other suitable shape, e.g., circular or a trapezoidal prism, that may be used to implement the 3D printing techniques described herein.

In this example, means for attachment of build plate 100 to a 3D printing apparatus are represented by slots or holes 101 (e.g., bolt holes) in each corner of top surface 110. Structural protrusions (e.g., bolts or tabs) of the 3D printing apparatus may be inserted into holes 101 to hold the build plate 100 in place during 3D printing. Although holes 101 are illustrated in each corner of top surface 100, it should be appreciated that depending on the implementation, build plate 100 may include holes 101 and/or protrusions in any suitable location on top surface 110, bottom surface 120, and/or other surface of build plate 100 to facilitate attachment to the 3D printing apparatus. In some implementations, holes 101 may be included on bottom surface 120 and not on top surface 110 to prevent powdered metal from 3D printing to fall into holes 101.

As depicted, build plate 100 includes a mortised or recessed section 140 extending through its center. The recessed section 140 is illustrated as having surfaces 145 (e.g., sidewalls) and a lower surface 150. As further described below, the recessed section 140 may be filled with a lower melting temperature metal or metal alloy that provides a thermally decomposable surface for building a 3D printed object.

Figure 2A:
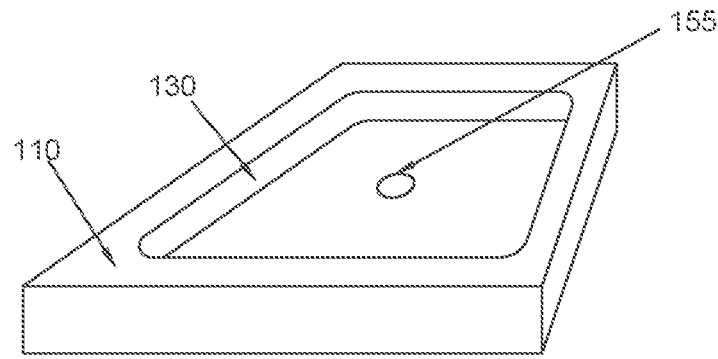
FIG. 2A shows an angled view of a build plate, in accordance with implementations of the disclosure.
Figure 2B:
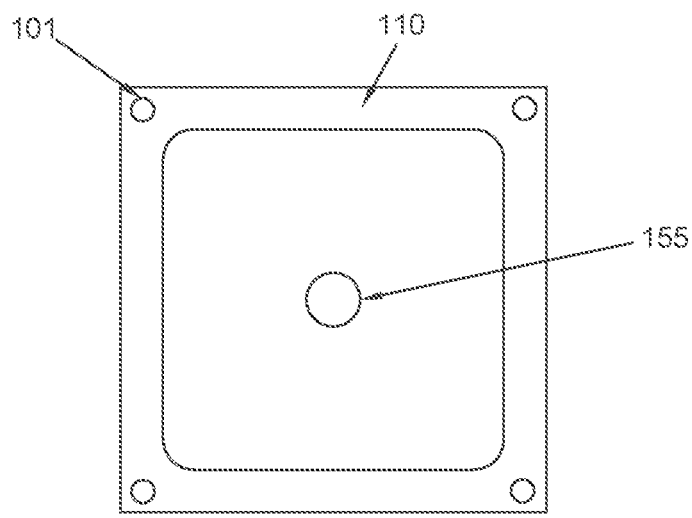
FIG. 2B shows a top view of the build plate of FIG. 2A.
Figure 2C:
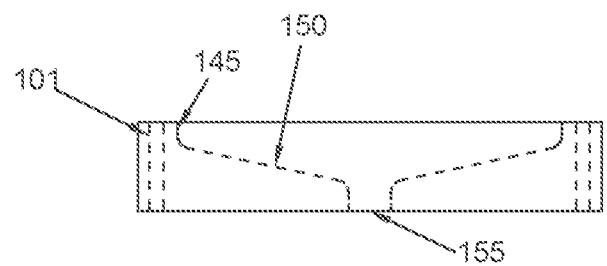
FIG. 2C shows a side view of the build plate of FIG. 2A.

The recessed section 140 may be in the form of a basin with a drain hole that extends all the way through the build plate 100 (e.g., from top surface 110 through bottom surface 120). This is depicted by FIGS. 2A-2C, which respectively show angled, top, and side views of build plate 100, including a recessed section 140 with a drain hole 155. As shown, the recessed section 140 is in the form of a basin that slopes downward toward hole 155 that extends out the bottom of build plate 100, thereby permitting a material (e.g., liquid metal) to be drained out of build plate 100. In FIG. 2C, the dashed outlines depict the corner holes 101, drainage hole 155, and basin shapes. The bottom edges of the basin leading to the drainage hole are sloped in this example.

It should be appreciated that although the examples of the disclosure show the lower surface of recessed section 140 sloping down at an acute angle toward a centered, circular hole 155, other basin constructions, slope angles, hole locations, and hole shapes may be utilized. For example, in some implementations, the recessed section may be implemented by perpendicularly sloping its sides into a flat bottom having a hole. In some implementations, the hole 155 may positioned off center (e.g., close to one of the corners of build plate 100). In some implementations, the hole 155 may instead drain through a side wall 130 of build plate 100. In some implementations, the hole 155 may be rectangular or square.

The recessed section 140 may be formed via any suitable machining process such as by using a morticing machine, a metal lathe, a milling machine, a drill, etc. For example, the recessed section 140 may be formed by morticing a solid block of metal. Depending on the implementation, the top perimeter and average depth of recessed section 140 may be optimized for the 3D printing device and process used with build plate 100. For example, the perimeter of the cutout may be shaped such that it does not interfere with a 3D printing device securing mechanism (e.g., providing sufficient space for holes 101) while providing a large enough surface area to form a 3D printed object. In some implementations, sufficient depth may be provided to optimize cooling and provide for a deeper channel.

Figure 3A:
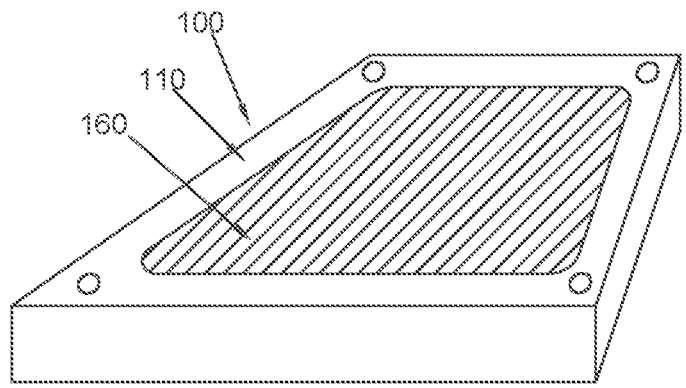
FIG. 3A shows an angled view of a build plate filled by a solid material, in accordance with implementations of the disclosure.
Figure 3B:
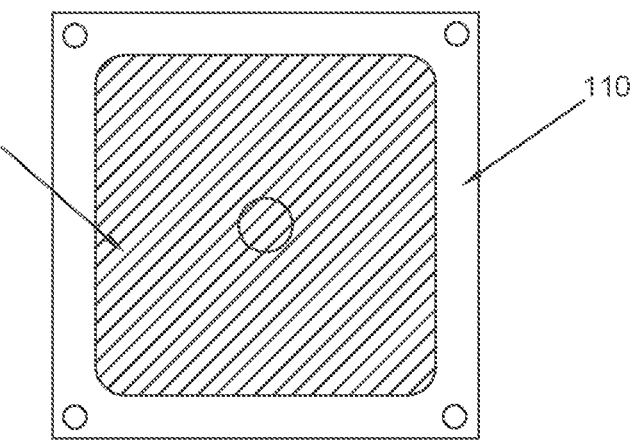
FIG. 3B shows a top view of the build plate of FIG. 3A.
Figure 3C:
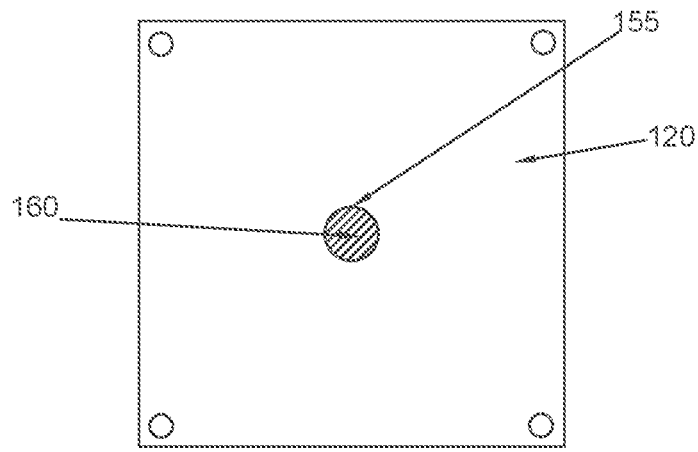
FIG. 3C shows a bottom view of the build plate of FIG. 3A.

FIGS. 3A, 3B, and 3C respectively show angled, top, and bottom views of a build plate 100 filled by a solid material 160. As depicted in this example, the material filling recessed section 140 forms a flat surface flush to the top edges of the recessed section. As shown by the bottom view in FIG. 3C, the solid material 160 filling the recessed section 140 is visible through the drainage hole 155. Although in this example, the solid material 160 forms a flat surface flush at the top edges of the build plate basin, in other implementations it may lie below the top edges of the build plate basin.

In implementations, the solid material 160 is a solid metal or metal alloy having a melting point lower than that of the material (e.g., metal) of the unfilled build plate 100. The solidus temperature of the metal or metal alloy may be at least 30° C. lower than that of the build plate 100. In some implementations, the differences in melting point may be more significant. For example, in some implementations the solidus temperature of the metal or metal alloy may be at least 50° C. lower, 100° C. lower, 200° C. lower, 400° C. lower, 600° C. lower, 800° C. lower, 1000° C. lower, or even more than 1000° C. lower than the solidus temperature of the build plate 100.

In some implementations, the solid material 160 is a solid metal or metal alloy having a solidus temperature of less than 300° C. In some implementations, it has a solidus temperature between 50° C. and 250° C. For example, the solid material 160 may be a solder alloy such as tin alloys (e.g., 96.5Sn3Ag0.5Cu), bismuth alloys (e.g., 58Bi42Sn) or indium alloys (e.g., 52In48Sn). In other implementations, the solid material 160 may be a single elemental metal such as tin, bismuth, indium, or others.

Figure 4A:
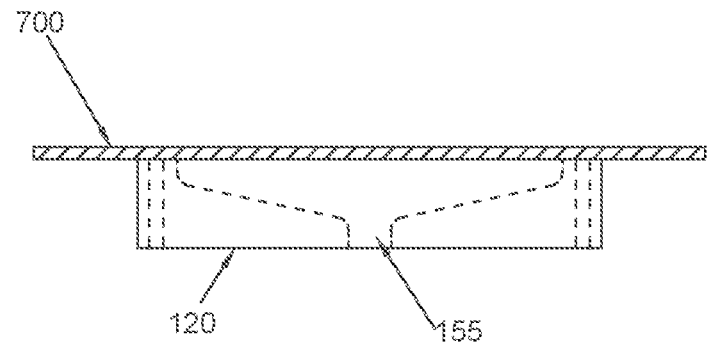
FIG. 4A depicts an example of a method of forming solid material in a recessed section of build plate, in accordance with implementations of the disclosure.
Figure 4B:
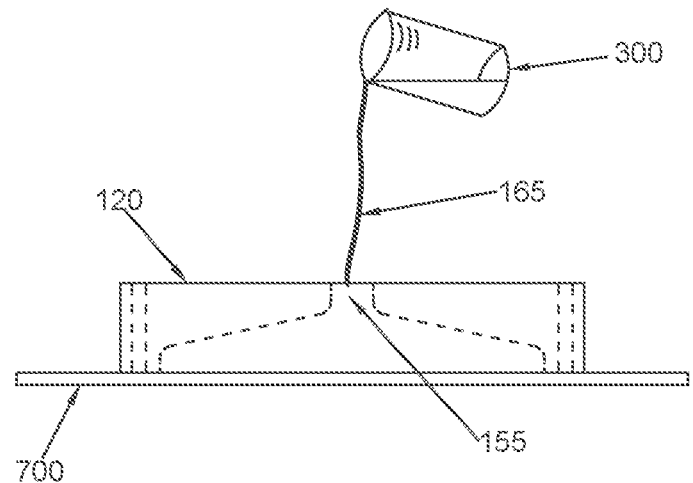
FIG. 4B depicts an example of a method of forming solid material in a recessed section of build plate, in accordance with implementations of the disclosure.

FIGS. 4A-4B depict one particular example of a method of forming solid material 160 in a recessed section 140 of build plate 100, in accordance with implementations of the disclosure. As depicted by FIG. 4A, which shows a side view of plate 100, a flat plate or lid 700 covers the top surface of build plate 100, extending beyond the edges of recessed section 140 and the top surface 110 of build plate 100. In other implementations, lid 700 may extend up to or just beyond the edges of recessed section 140. Lid 700 may be held in place using clamps or other suitable mechanical means to create a seal. The material of lid 700 may be comprised of a material such that it does not bond with build plate 100 but may be mechanically held in place to create an enclosed mold. For example, graphite, polytetrafluoroethylene, ceramic, cemented carbide, copper, stainless steel, tool steel, tin, aluminum, or some other suitable material may be used. The material of build plate 100 may be the same as or different from the material of lid 700.

After the lid 700 covers the top surface of build plate 100, the build plate 100 and lid 700 may be inverted, and the recessed section 140 may be filled through drain 155. In particular, FIG. 4B illustrates a side view of the inverted build plate 100 and lid 700. A container 300 may be used to pour a liquid 165 of material (e.g., metal or metal alloy) through drainage hole 155 onto lid 700, filling the recessed section 140. Prior to this step, the metal or metal alloy may be heated above its solidus temperature to form liquid 165. In some implementations, the use of a basin with acutely sloped sides may prevent the formation of air pockets when adding a liquid metal 165 through hole 155.

In this example implementation, by virtue of adding the liquid metal 165 through hole 155 with the assembly inverted, any unwanted accumulates (e.g., dross) may float to and settle at the top of the filled recessed section (i.e., where hole 155 is), thereby ensuring a clean metal or metal alloy surface is formed where 3D printing occurs.

Once the recessed section 140 is filled, the assembly may be cooled, causing liquid 165 to solidify (e.g., to form a solid material 160). Thereafter, the lid 700 may be removed to expose a smooth, solid phase metal or metal alloy that provides a build surface for a 3D metal printed object. To facilitate removal of lid 700 and ensure a smooth surface is formed (e.g., a flat surface flush to the top edges of the build plate recess), the lid 700 may be comprised of a material, e.g. graphite, polytetrafluoroethylene, ceramic, copper, stainless steel, tool steel, tin, aluminum, a non-stick metal, or some material that does not bond with liquid 165, before or after the liquid 165 solidifies.

It should be appreciated that although FIGS. 4A-4B depict one example technique for forming a solid material 160 in a recessed section 140 of a build plate 100 to provide a surface for a 3D printed object, other techniques are possible. For example, in some implementations a liquid metal or metal alloy may instead be poured from the opposite side, through the top surface of recessed section 140, first filling drain 155. In such implementations, a lid 700 may instead cover drain 155. In yet other implementations, drain 155 may be on the side of build plate 155 (e.g., through a side wall 130), in which case the liquid metal or metal alloy may be poured through the side wall.

Figure 9:
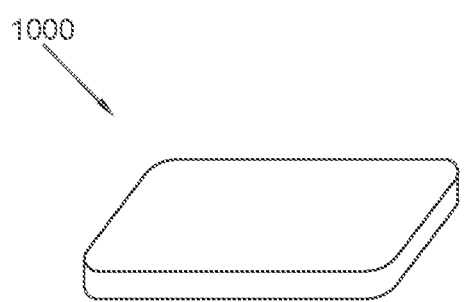
FIG. 9 depicts an insert that may be secured in a recess of a build plate, in accordance with implementations of the disclosure.

In other embodiments, the solid material 160 may be a pre-shaped solid insert that may be snapped or otherwise secured into or out of recessed section 140. The insert may be dimensioned such that it fits securely (e.g., occupies substantially all of the open volume) within the recessed section. In such instances, multiple duplicate molds of the solid insert may be formed, with each mold being utilized during a 3D printing process. By way of illustration, FIG. 9 illustrates an insert 1000 that may be used in accordance with implementations of the disclosure. Insert 1000 may be secured in recessed section 140 of a build plate. The insert 1000 may dimensioned such that after it is secured it forms a flat surface flush to the top edges of the recessed section 140.

A snap-in insert 1000 of solid material 160 obviates the requirement that an operator of the 3D printing system performs the labor-intensive process of casting the liquid metal 165 in advance, to form solid material 160 in the recessed section 140 of build plate 100. As such, additive manufacturing throughput may be significantly improved on the operator side by utilizing preformed, snap-in inserts. Additionally, the snap-in inserts may make operation of the 3D printing system more convenient and simpler for the operator. When an operator completes 3D printing onto a solid material 160, as described herein, the operator may snap the insert 1000 out, and subsequently melt the insert to retrieve the 3D printed object. For example, the insert may be snapped out by using a rod or other suitable tool to apply pressure to the insert via hole 155. A throughput advantage that may be realized from snapping out the insert with the 3D printed object is that the operator may quickly resume printing the next 3D metal printed object by snapping in a new insert 1000. In some implementations where inserts are utilized, build plate 100 may not include hole 155, and some other suitable technique may be utilized to snap the insert out. Alternatively, the insert may be removed by melting it while it is still attached to build plate 100, and collecting the liquid metal via drain hole 155 as further described below with reference to FIG. 7.

In some implementations, an operator may be supplied a container in which to place an insert (with the 3D printed object) prior to melting. The container may be sent back to the manufacturer of the solid insert (or some other party) to recycle the metal/metal alloy or reuse the metal/metal alloy to create a new insert (e.g., for the same user or a different user).

Figure 5:
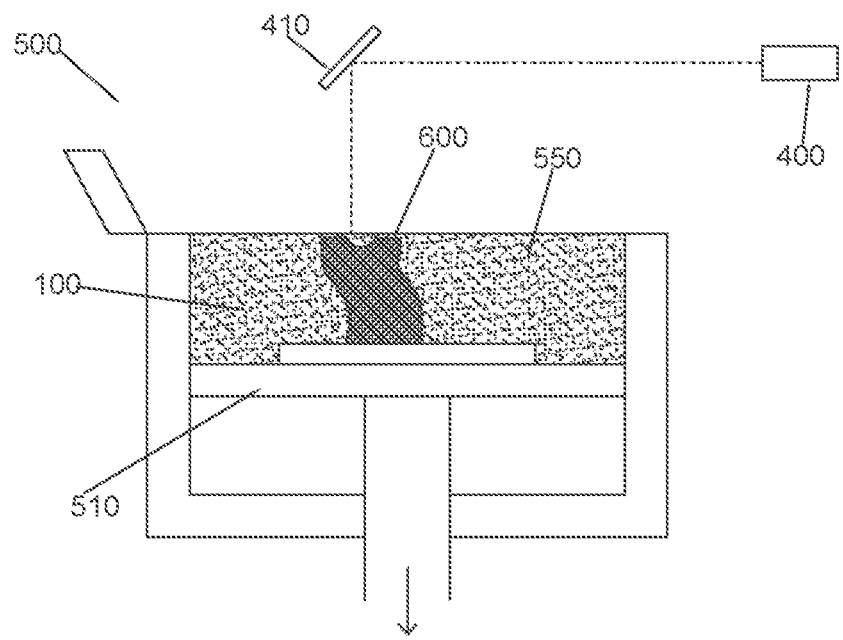
FIG. 5 illustrates a 3D metal printing process including a 3D metal printing device using a metal powder bed and a laser to form a 3D printed object on a build plate, in accordance with implementations of the disclosure.

FIG. 5 illustrates a 3D metal printing process including a 3D metal printing device 500 using a metal powder bed 550 and a laser 400 to form a 3D printed object 600 on a build plate 100, in accordance with implementations of the disclosure. Also shown is build plate loading platform 510 and optical component 410 for directing the output of a laser 400. The metal powder bed 550 may comprise aluminum, cobalt, copper, nickel, steel, stainless steel, titanium, vanadium, tungsten carbide, gold, bronze, platinum, silver alloys, cobalt-chromium alloys, refractory metals, a combination thereof, or some other suitable metal or metal alloy for forming 3D printed object 600. The 3D printed object may be laser sintered. Prior to beginning printing, a build plate 100 having a top surface including a region with a low melting temperature metal or metal alloy (e.g., top surface of solid material 160 filling a recessed section 140 as depicted by FIGS. 3A-3C) may be loaded into the 3D metal printing device 500. For example, build plate 100 may be placed on a platform 510 of device 500.

At the start of printing, a first layer of metal powder may be deposited (e.g., using a doctor blade or wiper blade) over the top surface of build plate 100, including solid material 160. Laser 400 or a series of lasers may then lase/sinter the deposited metal powder, causing the first layer of 3D printed object 600 to be metallurgically joined to the solid material. Thereafter, additional layers of powdered metal may be deposited by metal powder bed 550 and 3D printed object 600 may be created layer by layer. The device 500 may include a lowering mechanism (e.g., as part of platform 510) apparatus to allow for subsequent metal layers of the 3D printed object 600 to be formed. As the apparatus and build plate are lowered, a metal powder layer may be added to the top surface and a laser or laser(s) used to selectively join/sinter areas to the 3D printed object 600 below. At the completion of the aforementioned 3D printed process, build plate 100 with 3D printed object 600 may be removed from 3D printing device 500.

The melting temperature of the metal or metal alloy that is used to form 3D printed object 600 is higher than that of the solid material 160. For example, similar to the build plate 100, the solidus temperature of the 3D printed object 600 may be at least 30° C. higher than the solidus temperature of the metal or metal alloy. In some implementations, the differences in melting point may be more significant. For example, in some implementations the solidus temperature of the 3D printed object 600 may be 50° C. higher, 100° C. higher, 200° C. higher, 400° C. higher, 600° C. higher, 800° C. higher, 1000° C. higher, or even more than 1000° C. higher than the solidus temperature of the metal or metal alloy of solid material 160. In some implementations, the metal powder used to form 3D printed object 600 may comprise aluminum, cobalt, copper, nickel, steel, stainless steel, titanium, vanadium, tungsten carbide, gold, bronze, platinum, silver alloys, cobalt-chromium alloys, refractory metals, a combination thereof, or some other suitable metal or metal alloy.

It should be noted that although 3D printing may occur at room temperature, the heat generated by laser 400 may increase the temperature of solid material 160. To prevent premature melting of material 160 during 3D printing, this increase in temperature may be accounted for when selecting a suitable metal or metal alloy 160. In some implementations, the power of laser 400 may be decreased while forming lower layers of 3D printed object 600 to prevent overheating of material 160 during 3D printing.

Figure 6:
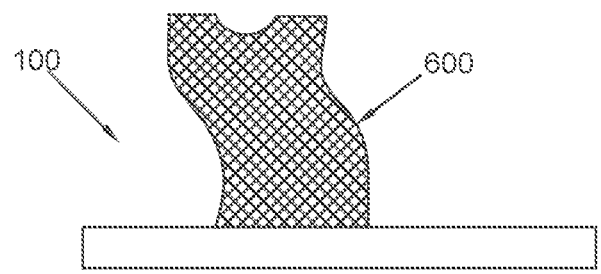
FIG. 6 shows an assembly including a metal 3D printed object metallurgically joined onto a build plate after the completion of 3D printing, in accordance with implementations of the disclosure.

FIG. 6 shows an assembly including the metal 3D printed object 600 metallurgically joined onto build plate 100 after the completion of 3D printing. In particular, the 3D printed object 600 may be joined to a surface of build plate 100 containing a low melting temperature solid material 160, as described above.

Figure 7:
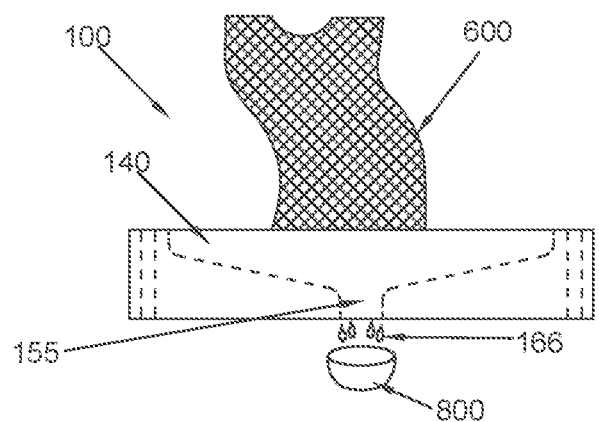
FIG. 7 shows a side view in which a low melting temperature metal or metal alloy filling a recessed section of a build plate is melting and draining through a drain hole into a collection apparatus while a 3D printed object and the build plate remain solid, in accordance with implementations of the disclosure.

Following 3D printing, the 3D printed object 600 is separated from build plate 100. To this end, the assembly may be heated (e.g., by placing the assembly in an oven) to a temperature above the solidus temperature of the low melting temperature solid material 160, thereby melting away the material and releasing the 3D printed object. The heat source is not limited to that of an oven. In other implementations, the 3D printed object 600 may be thermally separated from the solid material 160 by a heat source other than an oven such as by blow torch, heated air, heated liquid, hotplate, laser, or any other suitable heat source sufficient to melt the solid material 160, thereby releasing the 3D printed object 600. FIG. 7 shows a side view in which the low melting temperature metal or metal alloy filling the recessed section 140 of the build plate 100 is melting and draining (shown as melting liquid 166) through the drain hole 155 into container or collection apparatus 800 while the 3D printed object 600 and the remaining structure of build plate 100, including recessed section 140, remain solid. During this removal process, the 3D printed object 600 may be held in place by a tool. In some implementations, this process may be incorporated into a compartment of a 3D printing assembly. In an alternate separation method, prior to applying heat, a thin object such as a punch may be placed though drain hole 155 on the underside of build plate 100 with significant pressure to release the solid metal insert 160, with the 3D printed object 600 still attached, from the recessed section 140. The aforementioned combination may be placed into a container with a heated medium or subjected to other thermal treatment to cause the separation of solid metal insert 160 from 3D printed object 600. This separation method may be implemented on a preformed insert as described above, or on a solid material 160 formed via casting by the operator as described in FIGS. 4A-4B.

In this example, by virtue of having a collection apparatus 800 to collect the liquid metal or liquid metal alloy 166 during the phase change from solid to liquid, the collected metal or metal alloy may be reused to refill the recessed section 140 for future 3D printing operations. For example, the collected metal or metal alloy may be used to fill recessed section 140 as described above with reference to FIGS. 4A-4B, in preparation for printing a new 3D object. In another embodiment, the solid material 160 may be a pre-shaped solid insert as discussed above, which can be snapped into or out of recessed section 140, eliminating the need to repour liquid metal into the mold for the next printing.

Figure 8:
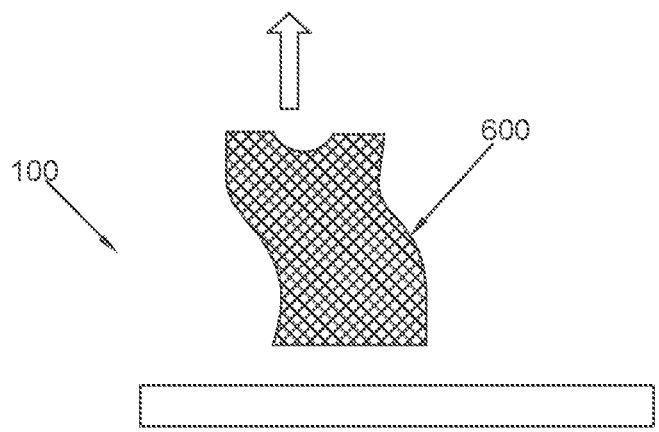
FIG. 8 depicts a 3D printed object after being separated from a build plate once the material filling recessed section is no longer solid and melted away, in accordance with implementations of the disclosure.

FIG. 8 depicts the 3D printed object 600 after being separated from build plate 100 once the material filling recessed section 140 is no longer solid and melted away. In some implementations, after separation of the 3D printed object 600, the collected metal or metal alloy may be used to refixture the object 600 for polishing, reshaping, and/or grinding, as needed. For example 3D printing parts may be held using a clamping mechanism for post processing. The lower melting point material 160 may be used to secure the 3D printed object 600 into a vice or clamping mechanism while performing the post processing functions above, so that the clamp does not contact the part 600 directly.

In some implementations, a mold used to cast a low melting point insert may also be inserted into the 3D metal printing machine 500 after casting and function as the build plate. It may in other instances be preferred to have one mold for casting an insert (e.g., insert 1000) and a separate build plate with a recessed area that receives the insert which together as one body is inserted into the 3D metal printing machine 500. This may allow for optimization of the mold for casting the insert and optimization of the build plate for use in the 3D printing machine 500.

Figure 10A:
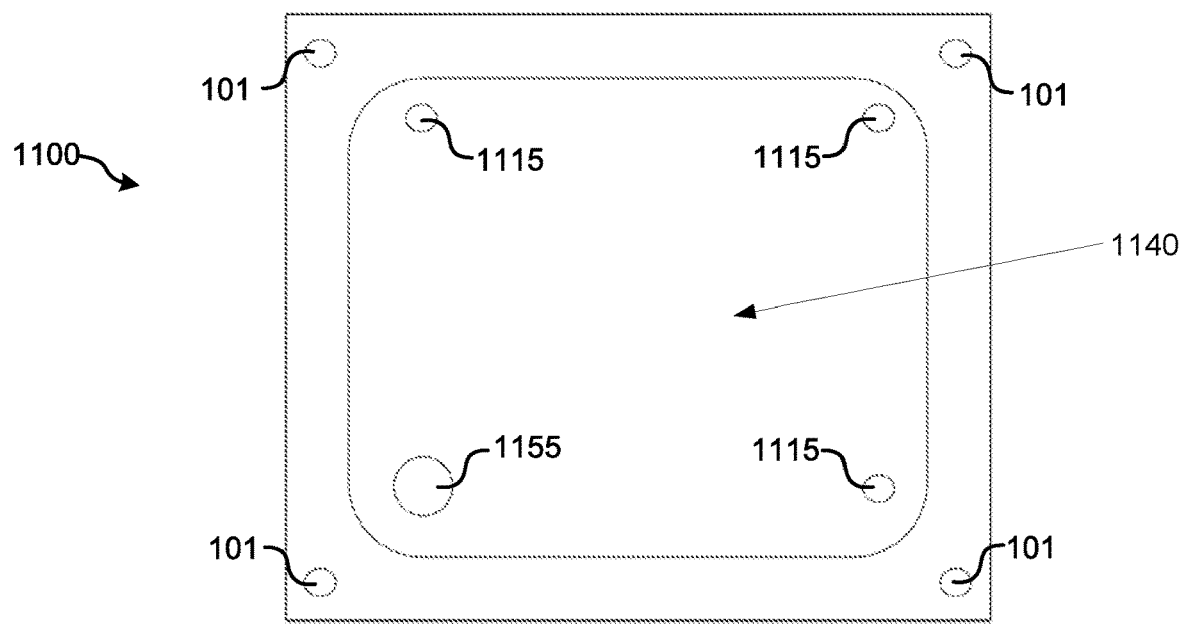
FIG. 10A shows a top view of a casting mold that may be used for casting inserts used with separate build plates during 3D printing, in accordance with implementations of the disclosure.
Figure 10B:
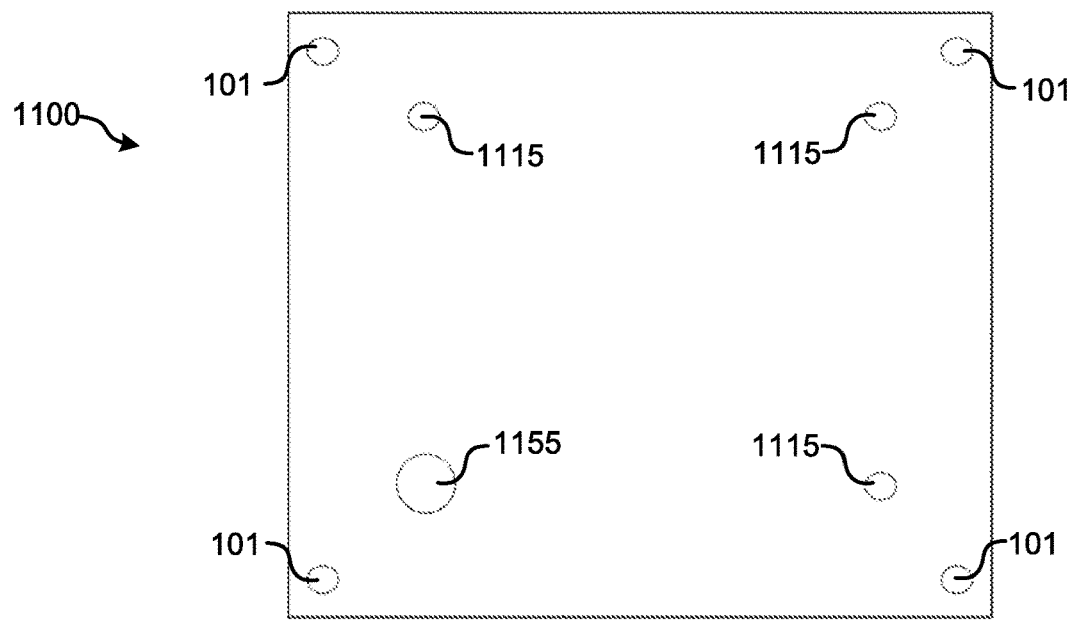
FIG. 10B shows a bottom view of the casting mold of FIG. 10A.
Figure 10C:
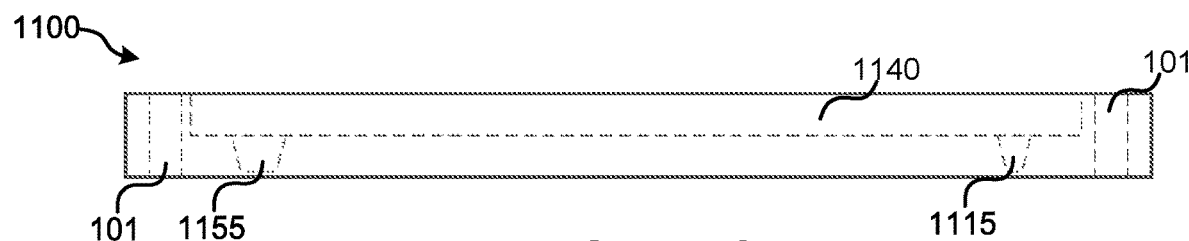
FIG. 10C shows a side view of the casting mold of FIG. 10A.

To this end, FIGS. 10A, 10B, and 10C respectively show top, bottom, and side views of a casting mold 1100 that may be used for casting inserts used with separate build plates during 3D printing, in accordance with implementations of the disclosure. As shown, casting mold 1100 includes a top surface, a bottom surface and four sidewalls that extend between the top and bottom surfaces.

The casting mold 1100, including the top, bottom, and side surfaces, may be made of a material similar to build plate 100, e.g., copper, stainless steel, tool steel, tin, aluminum, cemented carbide, ceramic, graphite, or some other suitable material. For example, if the casting mold 1100 is also usable as a build plate in a 3D printing machine 500, it may be made of material (e.g., metal or metal alloy) having a solidus temperature that is substantially higher (e.g., at least 30° C.) than that of a thermally decomposable material that is placed or formed in its recessed section 1140, and used to create a bond with a 3D printed object during 3D printing. For example, the casting mold 1100 may have a melting temperature that is greater than 1000° C. Alternatively, if the casting mold 1100 is not designed to be used during 3D printing, and it is optimized only for casting an insert, it may be made of a suitable material that optimizes the casting process.

Although depicted in the shape of a rectangular prism or cuboid having sidewalls that extend perpendicularly between the top surface and bottom surface, it should be noted that in other implementations casting mold may be some other suitable shape for casting an insert of a suitable shape for insertion into a build plate.

In this example, the casting mold 1100 includes means for attaching it to a 3D printing apparatus, which are represented by slots or holes 101 (e.g., bolt holes) running through each corner. Structural protrusions (e.g., bolts or tabs) of the 3D printing apparatus may be inserted into holes 101 to hold the mold 1100 in place during 3D printing. Although holes 101 are illustrated running in each corner from the top surface through the bottom surface, the holes 101 and/or protrusions may be in any suitable location on the top surface, bottom surface and/or other surface to facilitate attachment to the 3D printing apparatus. In implementations where casting mold 1100 is not used in a 3D printing apparatus, holes 101 may be omitted.

As depicted, casting mold 1100 includes a mortised or recessed section/cavity 1140 extending through its center. The recessed section 1140 is illustrated as having sidewalls and a lower surface. The recessed section may be in the form of a basin. The recessed section 1140 may be filled with a lower melting temperature metal or metal alloy to form a metal insert that provides a thermally decomposable surface for building a 3D printed object.

The recessed section 1140 may be formed via any suitable machining process such as by using a morticing machine, a metal lathe, a milling machine, a drill, etc. For example, the recessed section 1140 may be formed by morticing a solid block of metal. Depending on the implementation, the top perimeter and average depth of recessed section 1140 may be optimized for casting a metal insert.

The recessed section 1140 includes a pour hole 1155 and multiple air/venting holes 1115. In some implementations, the recessed section 1140 may include more than one pour hole 1155. For reasons further discussed below, it may be advantageous to add one or more additional holes in the bottom of the insert mold to function as air holes 1115 while the liquid metal is poured into the primary pour hole 1155. These optional air holes 1115 can be located within the interior perimeter of the mold recess or at another location and extend through the bottom side of the mold so that air can escape while filling metal into the primary pour hole.

The pour hole(s) 1155 and air/vent hole(s) 1115 may range in size. A pour hole with at least a 1 cm diameter may be sufficiently large enough to introduce a liquid metal into the mold cavity by pouring. The air hole(s) may be smaller, on the order of ½ cm or less. In this example, the air holes 1115 are illustrated as being smaller than the primary pour hole 1155. However, the air holes 1155 may also be larger than the primary pour hole 1155. Depending on the implementation, the casting mold 1100 may contain a single air hole, many air holes, or none at all. In some implementations, multiple holes having the same or similar diameter may function as both pour holes and air holes.

Figure 11A:
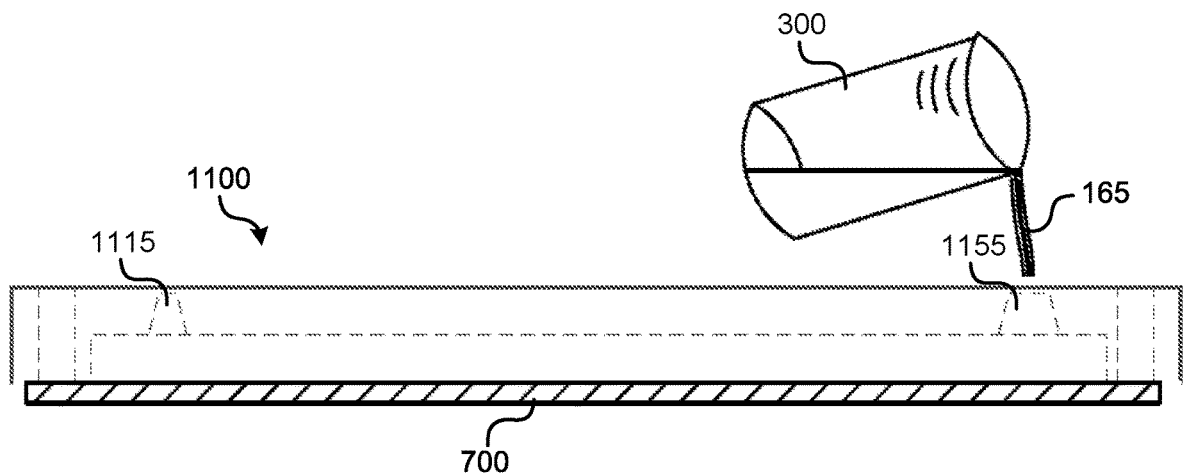
FIG. 11A depicts an example of a method of forming an insert in a recessed section of a casting mold, in accordance with implementations of the disclosure.
Figure 11B:
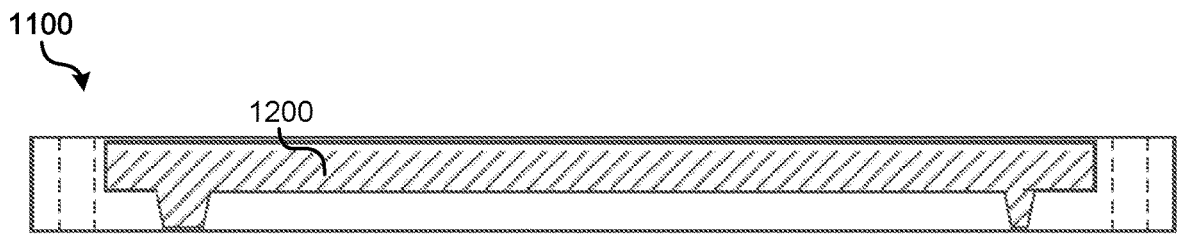
FIG. 11B depicts a casting mold after formation of an insert in a recessed section of the casting mold, in accordance with implementations of the disclosure.
Figure 11C:
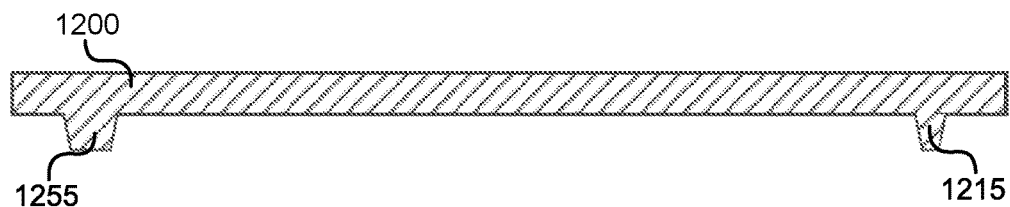
FIG. 11C depicts an insert after removal from the casting mold of FIG. 11B.

FIGS. 11A-11C depict one example of a method of forming insert 1200 in a recessed section 1140 of mold 1100, in accordance with implementations of the disclosure. As depicted by FIG. 11A, which shows a side view of mold 1100, a flat plate or lid 700 covers the top surface of mold 1100, extending beyond the edges of recessed section 1140. Lid 700 may be held in place using clamps or other suitable mechanical means to create a seal. The mold 1100 and lid 700 are inverted, and the recessed section 1140 may be filled through pour hole 1155. The material of lid 700 may be comprised of a material such that it does not bond with mold 1100 but may be mechanically held in place to create an enclosed mold. The material of mold 1100 may be the same as or different from the material of lid 700.

A container 300 may be used to pour a liquid 165 of material (e.g., metal or metal alloy) through pour hole 1155 onto lid 700, filling the recessed section 1140. Prior to this step, the metal or metal alloy may be heated above its solidus temperature to form liquid 165. Once the recessed section 1140 is filled, the assembly may be cooled, causing liquid 165 to solidify (e.g., to form a sold insert 1200). Thereafter, the lid 700 may be removed to expose an insert that may include a smooth, solid phase metal or metal alloy that provides a build surface for a 3D metal printed object.

When liquid 165 (e.g., liquid metal) is poured into mold 1100 during the casting process, the metal may displace the air in the mold 1100 and fill the cavity. One way to assist the air in escaping from the mold 1100 is to angle the mold (e.g., 30 degrees, 45 degrees, or 60 degrees) when pouring the liquid metal. The metal may enter through the bottom half of the pouring hole 1155 while air escapes through the top portion of the same hole 1155.

Alternatively, when it is not practical to angle the mold 1100 when pouring liquid metal, additional air or vent holes 1115 placed in the mold 1100 may allow the displaced air to escape. The mold 1100 shown in FIGS. 10A-10C and 11A-11B illustrates such air/venting holes 1115. When the metal fully displaces the air in the mold 1100, voiding in the metal insert 1200 may be minimized. This may ensure a smooth top of the insert 1200 that will serve as the build surface for 3D metal printing.

Interstitial and bottom-side voiding of the insert 1200 is also undesirable. Voiding within the insert 1200 or on its bottom-side may impede the flow of heat directly through the insert 1200, into the build plate and continuing downward through the build chamber. Voiding within the insert 1200 can cause "hot spots" that impede the downward thermal movement of heat through the structures mentioned above. Such "hot spots" could cause topside melting or deformation of the insert surface when subjected to laser heating during the 3D build process. Such deformation of the insert could cause structural failure of the 3D printed part, prior to print completion. The air/vent holes 1115 in the mold 1100 may help eliminate unwanted voiding in the insert 1100 and may help to ensure a steady, uninterrupted, downward thermal flow needed for a successful 3D metal print run.

In some implementations, it may be advantageous for the recessed section 1140 (not illustrated as tapered), air hole(s) 1115, and/or pour hole(s) 1155 to be tapered. The taper angles on the mold recessed section, pour hole(s), and/or air/vent hole(s) may be designed to help release the insert 1200 from the mold 1100. Such angles may be measured perpendicular to the parting line. Once the liquid 165 has hardened within the mold recessed section to form insert 1200, the cast insert 1200 may be removed from the mold 1100 and re-seated into a build plate cavity in preparation for 3D printing. Depending on the alloy material used for the insert 1200, the material may retract slightly upon solidification. By tapering the sides of the mold and/or air/vent and pour hole(s) by an appropriate "draft angle", the insert 1100 may be easier to remove from the mold. These angles may range from 1 degree to 15 degrees with tapers such as 5-10 degrees. Given that the insert 1200 is removed from the top of the mold 1100, the taper propagates towards the bottom, such that measuring the bottom internal dimension of the mold or holes will yield a smaller length and width than measuring the top from which the insert 1100 is extracted.

In some implementations, while the liquid 165 is poured into the pour hole 1155 of the mold 1100, the level may rise to partially fill the pour hole 1155 and air hole(s) 1115 with liquid metal that will solidify when cooled. This may be problematic because after the insert 1200 is removed from the mold 1100, the metal nubs 1255, 1215 that solidified in the pour and air holes can prevent the insert 1200 from properly seating into a recessed area of a build plate. In some implementations, this problem may be avoided by filling the mold 1100 below the level of the pour hole(s) and/or air hole(s). In other implementations, further discussed below, this problem may be addressed in the design of the build plate that receives the insert 1200.

Figure 12A:
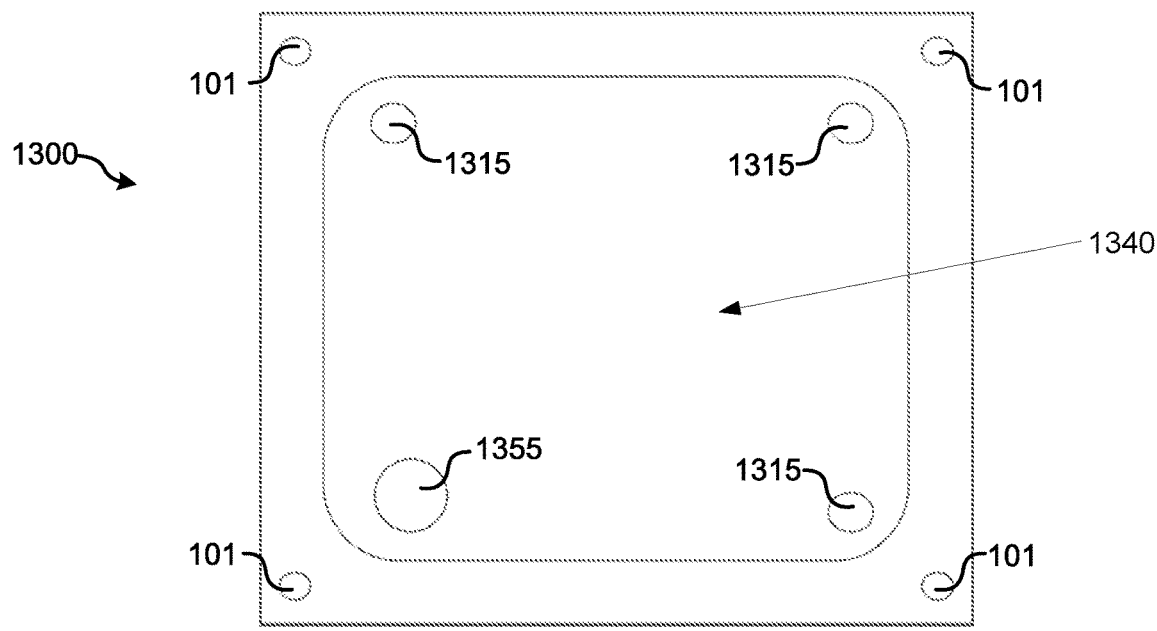
FIG. 12A shows a top view of a build plate that may be used during 3D printing, in accordance with implementations of the disclosure.
Figure 12B:
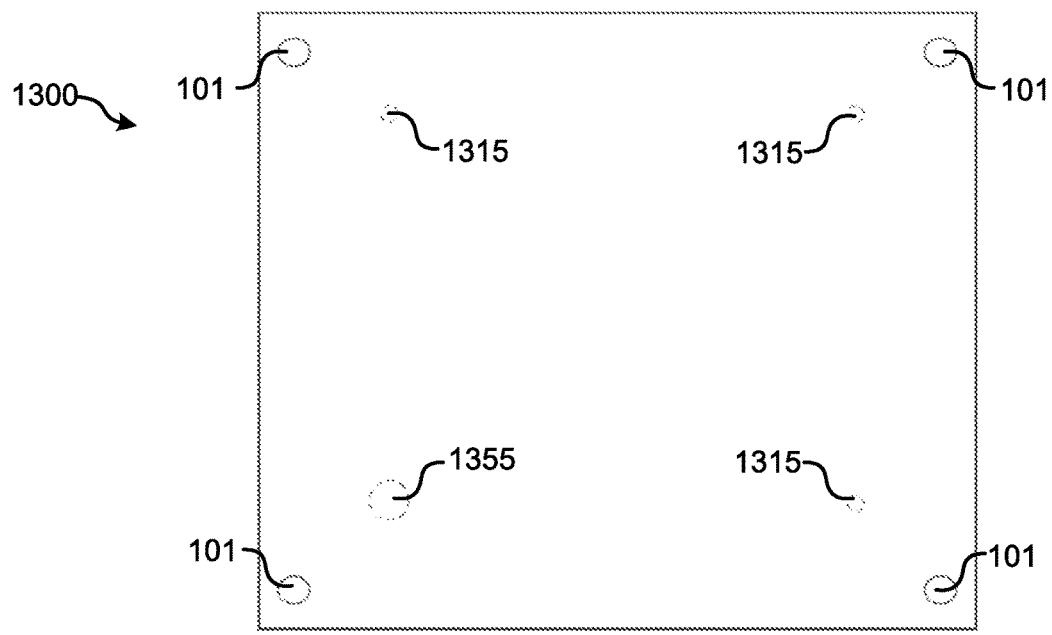
FIG. 12B shows a bottom view of the build plate of FIG. 12A.
Figure 12C:
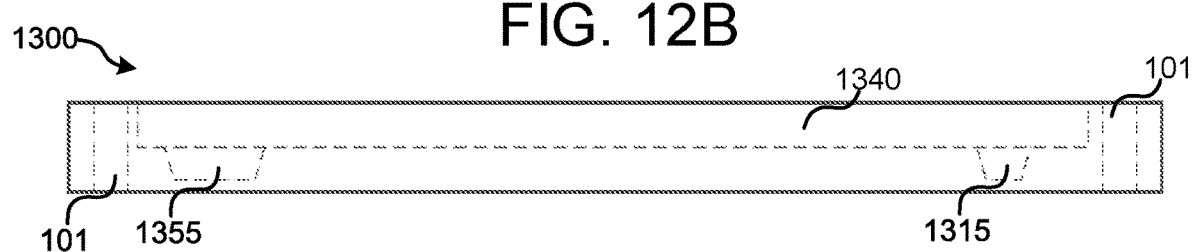
FIG. 12C shows a side view of the build plate of FIG. 12A.

FIGS. 12A, 12B, and 12C respectively show top, bottom, and side views of a build plate 1300 that may be used during 3D printing, in accordance with implementations of the disclosure. The build plate 1300 may be made of a similar material as discussed above with reference to build plate 100.

Build plate 1300 may be used in conjunction with mold 1100 as part of a 3D printing system. After an insert 1200 is formed in mold 1100, the insert 1200 may be removed from mold 1100 and placed in a recessed section 1340 in preparation for 3D printing.

Figure 13A:
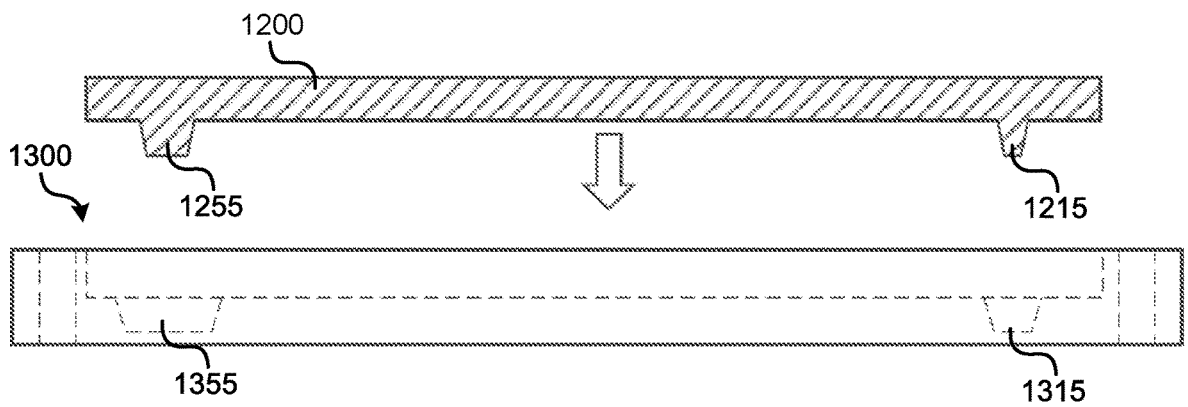
FIG. 13A depicts placement of an insert into a build plate, in accordance with implementations of the disclosure.
Figure 13B:
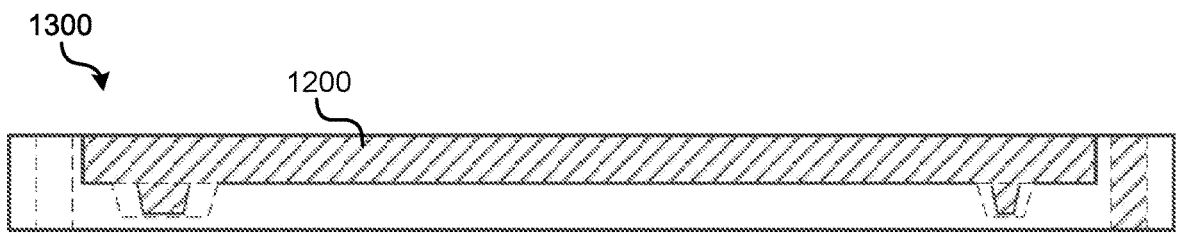
FIG. 13B depicts the build plate of FIG. 13B after placement of the insert.

FIGS. 13A-13B illustrate placement of an insert 1200 into build plate 1300, in accordance with implementations of the disclosure. To ensure the compatibility of build plate 1300 with mold 1100, recessed section 1340 may be similarly dimensioned as recessed section 1140. Additionally, in some implementations depicted by FIGS. 12A-12C and 13A-13B, recessed section 1340 of build plate 1300 includes holes 1355 and 1315 in locations that correspond to the locations of pour hole(s) 1155 and air hole(s) 1115 of mold 1100. These holes may accommodate metal nubs 1255, 1215 that solidified in the pour and air holes during formation of insert 1200, thereby ensuring insert 1200 can properly seat in recessed section 1340 of build plate 1300. Holes 1355 and 1315 may be formed by milling through holes or blind holes into the interior bottom of the build plate 1300 to accommodate the metal nub(s) located on the bottom side of the opposing metal insert 1200. Holes 1355 and 1315 may be slightly larger than the insert nub(s) 1255, 1215 to ensure a proper fit.

In some implementations, depicted by FIGS. 12A-12C and 13A-13C, the receiving hole(s) 1315, 1355 for the metal nub(s) 1215, 1255 of insert 1200 may contain a tapered angle. The tapered angles of cast 1100 and build plate 1300 may match to ensure proper seating of the insert 1200 into the build plate 1300 after the insert 1200 is removed from cast 1100. The taper angle(s) from the build plate 1300 may not exceed the taper angles of the mold 1100 to ensure proper seating of the insert 1200.

Figure 13C:
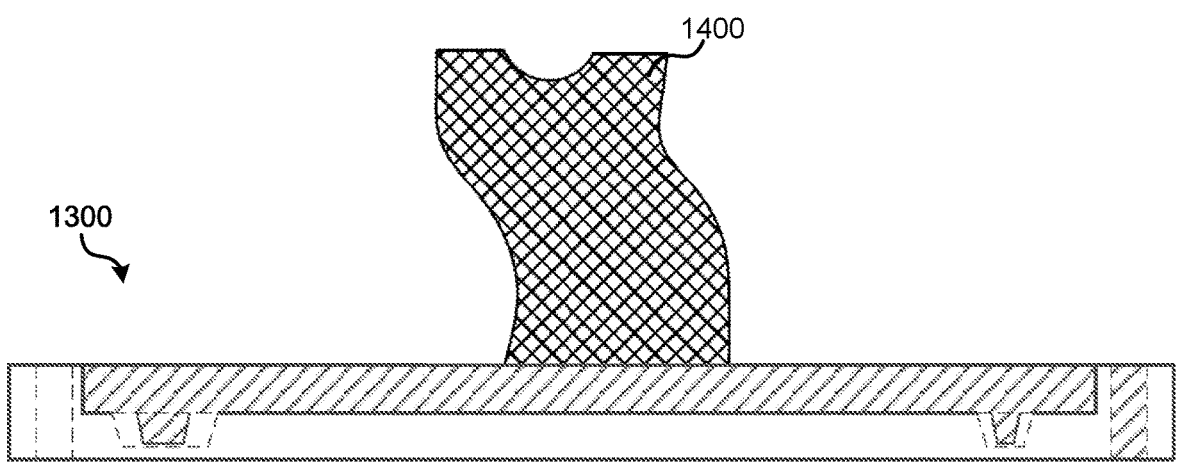
FIG. 13C depicts an assembly including a 3D printed object formed over a surface of an insert secured within a build plate, in accordance with implementations of the disclosure.

FIG. 13C depicts an assembly including 3D printed object 1400 formed over a surface of insert 1200 secured within build plate 1300. The 3D printed object 1400 may be formed by a 3D printing device 500 as discussed above with reference to FIG. 5. The 3D printed object 1400 may be released by removing insert 1200 from build plate 1300 and subsequently melting insert 1200.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

It should be appreciated that all combinations of the foregoing concepts (provided such concepts are not mutually inconsistent) are contemplated as being part of the inventive subject matter disclosed herein. In particular, all combinations of claimed subject matter appearing in this disclosure are contemplated as being part of the inventive subject matter disclosed herein.

What is claimed is:

1. A build plate for additive manufacturing, the build plate comprising:
    a body comprising: an external top surface, an external bottom surface, and external sidewalls dimensioned such that the build plate is useable in a 3D printing device;
    a recessed section formed through the external top surface of the body, the recessed section comprising:
        a pour hole extending through the external bottom surface of the body, the pour hole configured to receive a liquid form of a metal or metal alloy when the recessed section is not filled with a solid form of the metal or metal alloy; and
        one or more air holes extending through the external bottom surface of the body, the one or more air holes configured to release air displaced by the liquid form of the metal or metal alloy;
    the solid form of the metal or metal alloy filling the recessed section, the solid form including a build surface for forming a 3D printed metal object in the 3D printing device, the metal or metal alloy having a solidus temperature that is lower than a solidus temperature of the body and lower than a solidus temperature of the 3D printed metal object; and
    multiple bolt holes extending through the body and outside of the recessed section, the multiple bolt holes configured to receive bolts that attach the build plate to the 3D printing device and hold the build plate in place during 3D printing on the build surface.

2. The build plate of claim 1, wherein the pour hole is tapered to facilitate release of the solid form of the metal or metal alloy from the recessed section.

3. The build plate of claim 1, wherein the one or more air holes are tapered.

4. The build plate of claim 1, wherein the solid form of the metal or metal alloy forms a flat surface that is flush at the top edges of the recessed section.

5. The build plate of claim 1, further comprising: the 3D printed metal object printed on the build surface of the solid form of the metal or metal alloy.

6. The build plate of claim 1, wherein the pour hole and the one or more air holes are tapered to facilitate release of the solid form of the metal or metal alloy from the recessed section.

7. The build plate of claim 6, wherein each of the pour hole and the one or more air holes tapers at an angle from 1 to 15 degrees.

8. The build plate of claim 1, wherein the recessed section is tapered to facilitate release of the solid form of the metal or metal alloy from the recessed section.

9. The build plate of claim 1, wherein the solid form of the metal or metal alloy comprises a first protruding nub that was formed in the pour hole.

10. The build plate of claim 9, wherein the solid form of the metal or metal alloy further comprises one or more second protruding nubs that were formed in the one or more air holes.

11. The build plate of claim 10, wherein the first protruding nub and the one or more second protruding nubs are tapered.

12. The build plate of claim 11, wherein the pour hole and the one or more air holes are tapered to facilitate release of the solid form of the metal or metal alloy insert from the recessed section.

13. The build plate of claim 1, wherein the solidus temperature of the metal or metal alloy is less than 300° C.

14. The build plate of claim 13, wherein the solidus temperature of the metal or metal alloy is between 50° C. and 250° C.

15. The build plate of claim 1, wherein each of the multiple bolt holes extends through the external bottom surface of the body.

16. The build plate of claim 15, wherein each of the multiple bolt holes extends through both the external bottom surface and the external top surface of the body.

17. The build plate of claim 15, wherein the recessed section comprises an internal bottom surface within the body and internal sidewalls extending to the internal bottom surface.

18. The build plate of claim 1, wherein the multiple bolt holes comprise four bolt holes distributed along four corners of the body of the build plate.

19. The build plate of claim 18, wherein each of the four bolt holes extends through both the external bottom surface and the external top surface of the body.

20. An additive manufacturing system, comprising:
a 3D printing device; and
a build plate comprising:
  a body comprising an external top surface, an external bottom surface, and external sidewalls dimensioned such that the build plate is useable in the 3D printing device;
  a recessed section formed through the external top surface of the body, the recessed section comprising:
    a pour hole extending through the external bottom surface of the body, the pour hole configured to receive a liquid form of a metal or metal alloy when the recessed section is not filled with a solid form of the metal or metal alloy; and
    one or more air holes extending through the external bottom surface of the body, the one or more air holes configured to release air displaced by the liquid form of the metal or metal alloy;
  the solid form of the metal or metal alloy filling the recessed section, the solid form including a build surface for forming a 3D printed metal object in the 3D printing device, the metal or metal alloy having a solidus temperature that is lower than a solidus temperature of the body and lower than a solidus temperature of the 3D printed metal object; and
  multiple bolt holes extending through the body and outside of the recessed section, the multiple bolt holes configured to receive bolts that attach the build plate to the 3D printing device and hold the build plate in place during 3D printing on the build surface.

* * * * *